(12) United States Patent
Namikawa et al.

(10) Patent No.: US 9,831,039 B2
(45) Date of Patent: Nov. 28, 2017

(54) THIN FILM CAPACITOR (71) Applicant: TDK CORPORATION, Tokyo (JP)

(72) Inventors: Tatsuo Namikawa, Tokyo (JP); Junji Aotani, Tokyo (JP); Katsuyuki Kurachi, Tokyo (JP); Yuuki Aburakawa, Tokyo (JP); Shigeaki Tanaka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/953,807

(22) Filed: Nov. 30, 2015

(65) Prior Publication Data
US 2016/0163463 A1 Jun. 9, 2016

(30) Foreign Application Priority Data

Dec. 5, 2014 (JP) .................. 2014-246925

(51) Int. Cl.
*H01G 4/33* (2006.01)
*H01G 4/224* (2006.01)
*H01G 4/008* (2006.01)
*H01G 4/30* (2006.01)
*H01G 4/228* (2006.01)

(52) U.S. Cl.
CPC .............. *H01G 4/33* (2013.01); *H01G 4/008* (2013.01); *H01G 4/224* (2013.01); *H01G 4/228* (2013.01); *H01G 4/30* (2013.01); *H01G 4/306* (2013.01)

(58) Field of Classification Search
CPC .......... H01G 4/228; H01G 4/008; H01G 4/10; H01G 4/33; H01G 4/30; H01G 4/224; H01G 4/306
See application file for complete search history.

(56) References Cited

U.S. PATENT DOCUMENTS

| 4,811,162 A | 3/1989 | Maher et al. |
| 5,043,843 A | 8/1991 | Kimura et al. |
| 5,312,581 A | 5/1994 | Amano et al. |
| 5,712,758 A | 1/1998 | Amano et al. |

(Continued)

FOREIGN PATENT DOCUMENTS

| JP | 2003-109844 A | 4/2003 |
| JP | 2003-347157 A | 12/2003 |

(Continued)

*Primary Examiner* — Nguyen Ha
(74) *Attorney, Agent, or Firm* — Oliff PLC (57) ABSTRACT

A thin film capacitor comprises: a laminated body that has a base electrode, a dielectric layer and an upper electrode layer; a protective layer covering the base electrode, the dielectric layer and the upper electrode layer, and includes a first through-hole that reaches the base electrode, and a second through-hole that reaches the upper electrode layer; a first extraction electrode in the first through-hole and electrically connected with the base electrode; a second extraction electrode in the second through-hole and electrically connected with the upper electrode layer; a first terminal electrode on the protective layer, and connected with the base electrode through the first extraction electrode; and a second terminal electrode on the protective layer, and connected with the upper electrode layer through the second extraction electrode. Young's modulus of the protective layer is equal to or higher than 0.1 GPa and equal to or lower than 2.0 GPa.

5 Claims, 4 Drawing Sheets (56) References Cited

U.S. PATENT DOCUMENTS

| | | | |
|---|---|---|---|
| 5,774,326 A | | 6/1998 | McConnelee et al. |
| 6,118,647 A | | 9/2000 | Okinaka et al. |
| 6,226,170 B1 | * | 5/2001 | Nellissen .................. H01G 4/08 |
| | | | 361/302 |
| 6,254,971 B1 | | 7/2001 | Katayose et al. |
| 6,337,790 B1 | | 1/2002 | Nellissen et al. |
| 2005/0056878 A1 | * | 3/2005 | Shioga .............. H01L 21/76804 |
| | | | 257/300 |
| 2005/0111162 A1 | | 5/2005 | Osaka et al. |
| 2006/0214205 A1 | * | 9/2006 | Baniecki ................ H01G 4/005 |
| | | | 257/295 |
| 2007/0064374 A1 | | 3/2007 | Togashi et al. |
| 2007/0074806 A1 | | 4/2007 | Kojima et al. |
| 2008/0145996 A1 | | 6/2008 | Nomura et al. |
| 2008/0164563 A1 | * | 7/2008 | Nomura ................... H01G 2/10 |
| | | | 257/532 |
| 2009/0139891 A1 | * | 6/2009 | Oshima ................ B32B 38/145 |
| | | | 206/497 |
| 2010/0246089 A1 | * | 9/2010 | Yano ...................... H01G 4/228 |
| | | | 361/306.1 |
| 2011/0075317 A1 | | 3/2011 | Oikawa et al. |

FOREIGN PATENT DOCUMENTS

| | | |
|---|---|---|
| JP | 2008-153497 A | 7/2008 |
| JP | 2011-077151 A | 4/2011 |

\* cited by examiner

THIN FILM CAPACITOR

TECHNICAL FIELD

The present invention relates to a thin film capacitor.

BACKGROUND

A thin film capacitor includes a structure in which a capacitor element made up of a lower electrode layer, a dielectric layer and an upper electrode layer which are successively laminated is covered with a protective layer. The protective layer is provided with a through-hole for connecting the lower electrode layer or the upper electrode layer with a terminal electrode (see Patent Literatures 1 and 2). The through-hole is provided with an extraction electrode, and the terminal electrode is provided on the extraction electrode.

[Patent Literature 1] Japanese Unexamined Patent Publication No. 2003-109844

[Patent Literature 2] Japanese Unexamined Patent Publication No. 2003-347157

SUMMARY

One function of a protective layer is the function of holding a terminal electrode for connecting a capacitor element and an external circuit. Here, during an operation of the capacitor element, the capacitor element is deformed based on an electrostrictive effect of a dielectric layer. It is desirable that the protective layer be one which does not spread such deformation of the capacitor element to the terminal electrode. For a thin film capacitor, the capacitor element is thin compared to a laminated ceramic capacitor. Therefore, for the thin film capacitor, it is difficult to form the terminal electrode and maintain an electrical contact of the terminal electrode with the lower electrode layer or the upper electrode layer. In the thin film capacitor, it is important to have a function that the protective layer does not spread the deformation of the capacitor element to the terminal electrode.

However, according to study by the present inventors, influence that the deformation of the capacitor element exerts on the terminal electrode is often not resolved by a conventionally known protective layer. For example, when a thin film capacitor described in Patent Literatures 1 and 2 was experimentally produced, a tendency that an electrical connection performance of the terminal electrode and the lower electrode or the upper electrode declines with time was recognized.

The present invention is implemented in consideration of the above-described problem, and an object is to provide a thin film capacitor that can maintain an electrical connection performance of a terminal electrode and a lower electrode or an upper electrode and stabilize an electrical connection of a capacitor element and an external circuit more.

The above-described problem is solved by the thin film capacitor relating to the present invention. The thin film capacitor relating to the present invention comprises: a laminated body that has a base electrode, a dielectric layer and an upper electrode layer in this order; a protective layer that covers at least a part of the base electrode, the dielectric layer and the upper electrode layer, and includes a first through-hole that reaches the base electrode, and a second through-hole that reaches the upper electrode layer; a first extraction electrode that is provided in the first through-hole and electrically connected with the base electrode; a second extraction electrode that is provided in the second through-hole and electrically connected with the upper electrode layer; a first terminal electrode that is arranged on the protective layer, and connected with the base electrode through the first extraction electrode; and a second terminal electrode that is arranged on the protective layer, and connected with the upper electrode layer through the second extraction electrode. At the time, a modulus of longitudinal elasticity (generally called "Young's modulus"; simply called "Young's modulus" hereinafter) of the protective layer is equal to or higher than 0.1 GPa and equal to or lower than 2.0 GPa. By this configuration, mechanical connection strength of the terminal electrode and the extraction electrode is maintained, and thus a connection of the thin film capacitor with an external circuit can be stabilized. When the Young's modulus becomes higher than 2.0 GPa, deformation based on an electrostrictive effect of the dielectric layer generated through use of the capacitor is not easily absorbed by the protective layer and spreads to the terminal electrode, thus the mechanical connection strength of the terminal electrode and the extraction electrode is not easily maintained, and it becomes difficult to maintain an electrical connection of the base electrode or the upper electrode and the external circuit through the terminal electrode. Also, in the case that the Young's modulus is lower than 0.1 GPa, fixation on the protective layer of the terminal electrode becomes instable, and the mechanical connection strength of the terminal electrode and the extraction electrode is not maintained.

In the protective layer of the thin film capacitor relating to the present invention, a thickness from an upper end of the laminated body for which the dielectric layer and the upper electrode layer are successively laminated on the base electrode to an upper surface of the protective layer can be equal to or thicker than 3.0 µm and be equal to or thinner than 7.0 µm. By this configuration, a metal layer configuring the terminal electrode can be separated from the dielectric layer, and the deformation based on the electrostrictive effect of the dielectric layer generated through the use of the capacitor can be more efficiently absorbed. As a result, the electrical connection of the thin film capacitor and the external circuit through the terminal electrode can be more stabilized. In the case that the thickness is thinner than 3.0 µm, the deformation based on the electrostrictive effect of the dielectric layer generated through the use of the capacitor sometimes spreads to the terminal electrode. Also, in the case that it is thicker than 7.0 µm, the fixation on the protective layer of the terminal electrode tends to become instable.

The thin film capacitor relating to the present invention can be a structure having insulating layers in addition to the protective layer. The insulating layers cover the protective layer right under the terminal electrode. Specifically, the insulating layer including an opening can be provided respectively between the protective layer and the first terminal electrode, and between the protective layer and the second terminal electrode. A structure can be such that a deposition area of the insulating layer has an area wider than an area of the first terminal electrode and the second terminal electrode. At the time, the insulating layer may be the one that covers only a part right under the terminal electrode and the periphery in the protective layer, or may be the one that covers the entire area of the protective layer. The Young's modulus of the insulating layer can be equal to or higher than 3.0 GPa. By this configuration, the fixation on the protective layer of the terminal electrode can be stabilized further. An upper limit value of the Young's modulus of the insulating layer sometimes needs to be defined depending on presence/absence of a post-process of the insulating layer and a kind. However, at a viewpoint of an effect of stabilizing the fixation on the protective layer of the terminal electrode mode, it is not needed to always provide the upper limit value.

The base electrode of the thin film capacitor of the present invention can be Ni foil. The Ni foil is a material having resistance to oxidation and low electric resistance, and has high hardness and the Young's modulus compared to other representative conductive materials (metals such as Cu or Al). Therefore, the base electrode contributes to shape maintenance of the protective layer, and the terminal electrode can be fixed on the protective layer further stably as an effect of the present invention.

According to the thin film capacitor relating to the present invention, the thin film capacitor for which the electrical connection with the external circuit is more stabilized can be provided.

DETAILED DESCRIPTION

Hereinafter, suitable embodiments of the present invention will be described. Note that the present invention is not limited to the following embodiments. Same signs are attached to same or equivalent elements, and in the case that description is redundant, the description will be omitted.

Figure 1:
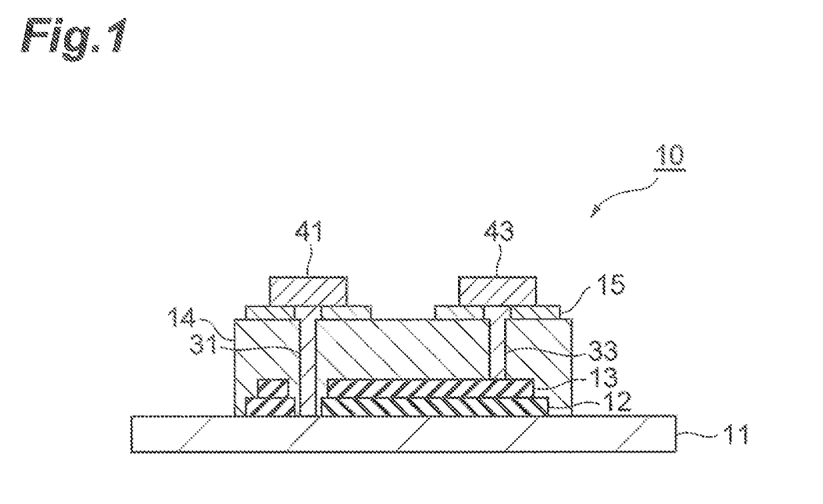
FIG. 1 is a schematic sectional view illustrating a structure of a thin film capacitor relating to one embodiment of the present invention.

FIG. 1 is a schematic sectional view illustrating a structure of a thin film capacitor relating to the present embodiment. A thin film capacitor 10 comprises: a base electrode 11; a dielectric layer 12 laminated on the base electrode 11; an upper electrode layer 13 laminated on the dielectric layer 12; a protective layer 14 that covers the dielectric layer 12 and the upper electrode layer 13 and includes a first through-hole (no sign display in the figure) on the base electrode 11, and a second through-hole (no sign display in the figure) on the upper electrode layer 13 respectively; a first extraction electrode 31 that is arranged in the first through-hole inside the protective layer 14 and electrically connected with the base electrode 11; a second extraction electrode 33 that is arranged in the second through-hole inside the protective layer 14 and electrically connected with the upper electrode layer 13; a first terminal electrode 41 that is arranged on the protective layer 14, and connected with the base electrode 11 through the first extraction electrode 31 for being connected with an external circuit; a second terminal electrode 43 that is arranged on the protective layer 14, and connected with the upper electrode layer 13 through the second extraction electrode 33 for being connected with the external circuit; and an insulating layer 15 that covers the protective layer 14 right under the first terminal electrode 41 and the second terminal electrode 43.

The base electrode 11 is not limited in particular as long as it is a material having conductivity. As a material of the base electrode 11, a metal, an oxide, an organic conductive material or the like can be appropriately selected. As a material having high electric conductivity, for example, at least one of Ni, Pt, Pd, Ir, Ru, Rh, Re, Os, Au, Ag, Cu, $IrO_2$, $RuO_2$, $SrRuO_3$, and $LaNiO_3$ may be included. It is preferable that a film thickness of the base electrode 11 is 50-2000 nm from a viewpoint of electric conductivity and mechanical strength. In the case of being below 50 nm, there is a case that the electric resistance of the base electrode 11 becomes large and electrical characteristic of the thin film capacitor is lowered. In the case of being over 2000 nm, a pressure that internal stress of the base electrode 11 exerts on the dielectric layer 12 tends to be remarkable. The base electrode 11 may be provided on a substrate (not shown in the figure) of Si or alumina or the like, or the base electrode 11 may also serve a function of the substrate. In this case the base electrode 11 and the substrate are of the same material. For example, foil or a plate whose main component is a base metal such as Ni, Cu or Al or an alloy thereof, or a plate or foil of stainless steel, Inconel® or the like can be suitably used. In particular, Ni foil is preferable since it has high conductivity, also has high hardness and the Young's modulus, and contributes to shape maintenance of the protective layer 14 and the insulating layer 15. It is preferable that a thickness of the base electrode 11 in the case that the base electrode 11 and the substrate are of the same material is 5 μm-500 μm. In the case that the thickness of the base electrode 11 is below 5 μm, there is a case that the mechanical strength of the base electrode 11 is below magnitude that can maintain a shape of the protective layer 14 and the insulating layer 15. In the case that the thickness of the base electrode 11 exceeds 500 μm on the contrary, there is a case that a storage amount of a strain due to a thermal history inevitable in a thin film capacitor manufacturing process becomes large and adversely affects the shape maintenance of the protective layer 14 and the insulating layer 15. In the present embodiment, a mode of using the Ni foil for the base electrode 11 is indicated. The base electrode 11 which is the Ni foil has a function as a holding member that holds the dielectric layer 12 and the upper electrode layer 13 or the like and a function as a lower electrode layer together. Note that, in the case of a mode of using a substrate/electrode film structure, a structure which is a combination of the substrate/the electrode film can be made to correspond to the base electrode 11 of the present embodiment to attain the embodiment of the present invention.

For the dielectric layer 12, a perovskite type oxide such as barium titanate ($BaTiO_3$, called "BT" hereinafter), barium strontium titanate (($BaSr)TiO_3$, called "BST" hereinafter), strontium titanate ($SrTiO_3$, called "ST" hereinafter), calcium zirconate ($CaZrO_3$, $(BaSr)(TiZr)O_3$, called "CZ" hereinafter), or $BaTiZrO_3$ is suitably used. The dielectric layer 12 may be a composite material including one or more of these oxides, or may be a laminated body of a plurality of dielectric layers. A film thickness of the dielectric layer 12 can be about 100-1000 nm from a viewpoint of a function of a dielectric element and mechanical strength retention. A forming method of the dielectric layer 12 is not limited in particular, and a known dielectric thin film creating method can be appropriately selected and used. For example, a physical vapor growth method such as a sputtering method or an evaporation method may be used, or a chemical vapor growth method such as a plasma CVD method may be used. Or, a solution method of applying and firing a solution containing a starting material may be also used.

The upper electrode layer 13 is not limited in particular as long as it is a material having conductivity. As a material of the upper electrode layer 13, a metal, an oxide, an organic conductive material or the like can be appropriately selected. As a material having high electric conductivity, for example, at least one of Ni, Pt, Pd, Ir, Ru, Rh, Re, Os, Au, Ag, Cu, $IrO_2$, $RuO_2$, $SrRuO_3$, and $LaNiO_3$ may be included. In particular, a conductive material configured with Cu, Ni, Pt, Pd, Ir, Ru, Rh, Re, Os, Au, or Ag as the main component is preferable, and above all, the conductive material configured with Ni as the main component is preferable from the viewpoint of the electrical characteristic and the mechanical strength. The upper electrode layer 13 does not need to use Ni as a single layer, and may be a laminated structure like Ni/Cu for example. In this case, a Ni layer side of the upper electrode layer 13 can be brought into contact with the side of the dielectric layer 12, and a Cu side can be turned to the outside. Further, since Cu is highly conductive compared to Ni, by increasing the thickness of Cu compared to that of Ni, the conductivity of the upper electrode layer 13 can be increased.

For the protective layer 14, a material whose Young's modulus is equal to or higher than 0.1 GPa and is equal to or lower than 2.0 GPa can be appropriately selected and used. For example, an insulating resin such as a polyimide-based resin, an epoxy-based resin, a phenol-based resin, a benzocyclobutene-based resin, a polyamide-based resin, or a fluorine-based resin can be suitably used. In particular, the polyimide-based resin is preferable in terms of low moisture absorption rate and water absorption rate. The Young's modulus of these materials can be adjusted by appropriately using known means of adjusting a mechanical characteristic of a polymer material. For example, means of (1) introducing an alkyl group to a side chain or a molecular chain, (2) introducing (vulcanizing) sulfur to the molecular chain, (3) reducing crosslinking points (changing an oxygen group of the molecular chain to a hydrogen end, or the like), or (4) limiting polymerization reaction by feeding a polymerization inhibitor in the middle of reaction can be used.

The Young's modulus of the protective layer 14 can be obtained by a nanoindentation method. While a nanoindenter used in the nanoindentation method is known as a method of evaluating the mechanical characteristic of a thin film by indentation of an indenter, in order to evaluate the mechanical strength of the thin film itself, it is needed to obtain a load-displacement curve by such a maximum indentation depth that influence of a base is not received. It is desirable that the Young's modulus of the protective layer 14 described above is a result calculated from the load-displacement curve obtained by turning the maximum indentation depth to about ⅕ to ⅓ of the film thickness of the protective layer 14 in consideration of the influence of the base. Specifically, it is desirable to perform preliminary measurement by a low load which is the load of about 20 mN to 100 mN. The protective layer 14 covers not only the dielectric layer 12 and the upper electrode layer 13 but also a part of the base electrode layer 11.

In the case of providing the insulating layer 15, a material whose Young's modulus is equal to or higher than 3.0 GPa can be appropriately selected and used. For example, an insulating resin such as a polyimide-based resin, an epoxy-based resin, a phenol-based resin, a benzocyclobutene-based resin, a polyamide-based resin, or a fluorine-based resin or the like can be suitably used. The Young's modulus of the material of the insulating layer 15 can be also adjusted by appropriately using the known means of adjusting the mechanical characteristic of the polymer material, similarly to the case of the protective layer 14. Again, examples are the means of (1) introducing an alkyl group to a side chain or a molecular chain, (2) introducing (vulcanizing) sulfur to the molecular chain, (3) reducing crosslinking points (changing an oxygen group of the molecular chain to a hydrogen end, or the like), or (4) limiting polymerization reaction by feeding a polymerization inhibitor in the middle of reaction. The Young's modulus of the insulating layer 15 can be also obtained by using the nanoindentation method similarly to the protective layer 14.

The insulating layer 15 can be formed by several modes. The insulating layer 15 may be the one that covers only the protective layer 14 right under the first terminal electrode 41 and the second terminal electrode 43 and the periphery thereof, as illustrated in FIG. 1. Also, as in another embodiment of the present invention illustrated in FIG. 2, the insulating layer 15 may not be always formed. On the contrary, as in a further embodiment of the present invention illustrated in FIG. 3, the mode may be such that the entire area of the protective layer 14 is covered with the insulating layer 15.

For the first extraction electrode 31 and the second extraction electrode 33, a highly conductive material can be appropriately selected and used. For example, Au, Ag, Pt, Cu or the like can be used. From the viewpoint of compatibility of the mechanical characteristic and the electric conductivity, a configuration with Cu as the main component is preferable.

For the first terminal electrode 41 and the second terminal electrode 43, a highly conductive material can be appropriately selected and used. For example, Au, Ag, Pt, Cu or the like can be used. From the viewpoint of the compatibility of the mechanical characteristic and the electric conductivity, a configuration with Cu as the main component is preferable. On an outer layer of the first terminal electrode 41 and the second terminal electrode 43, a layer of Au, Ni, Sn, Pd or the like may be provided.

Next, with reference to FIGS. 4A to 4F, a manufacturing method of the thin film capacitor 10 will be described.

Figure 4A:
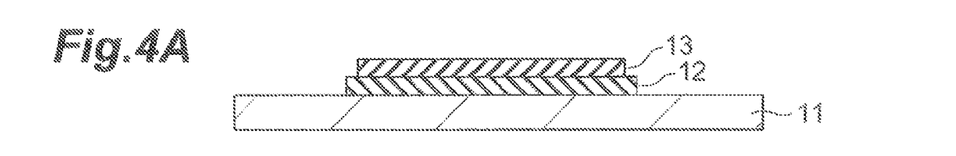
FIG. 4A to FIG. 4F are schematic sectional views illustrating a manufacturing method of the thin film capacitor relating to one embodiment of the present invention.

First, as illustrated in FIG. 4A, deposition of the dielectric layer 12 and deposition of the upper electrode layer 13 are performed onto the base electrode 11 to form a laminated body.

Figure 4B:
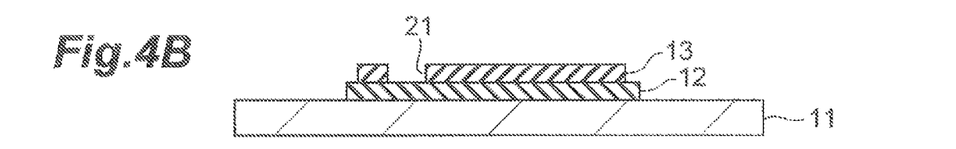

Next, as illustrated in FIG. 4B, wet etching is executed in a direction of the base electrode 11 to a part of the upper electrode layer 13 to form an opening 21. When etching the upper electrode layer 13, after patterning by photolithography is executed, an etching solution (etchant) of ferric chloride or the like is used.

Figure 4C:
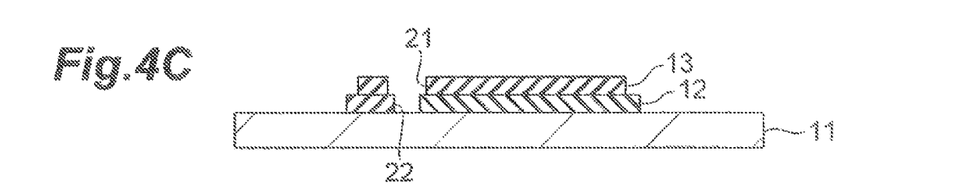

Next, as illustrated in FIG. 4C, to a part of the dielectric layer 12 exposed at the opening 21, wet etching is executed in the direction of the base electrode 11 from a surface positioned on an opposite side of the base electrode 11 in the laminated body to form an opening 22. When etching the dielectric layer 12, an etching solution (etchant) which etches a dielectric material but does not etch the material of the electrode layer is used. Specifically, in the case that the dielectric layer 12 is BT, BST or ST for example, a preferable etchant is hydrochloric acid+ammonium fluoride solution. Also, in the case that the dielectric layer 12 is CZ, a preferable etchant is sulfuric acid+ammonium fluoride solution.

Figure 4D:
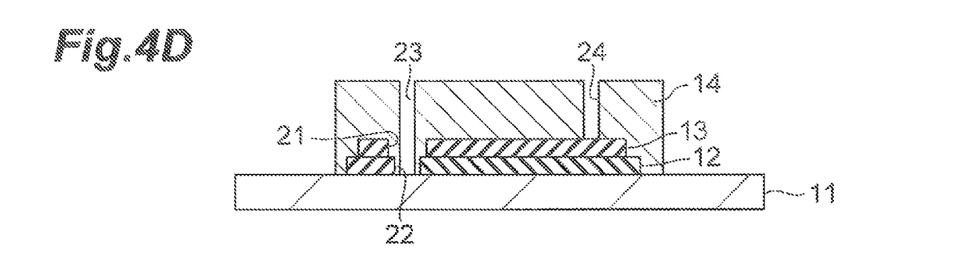

Next, as illustrated in FIG. 4D, the protective layer 14 is formed. At the time, an opening 23 of the protective layer 14 is provided inside the openings 21 and 22, and an opening 24 of the protective layer is provided on an area other than the opening 21 of the upper electrode layer 13.

Figure 4E:
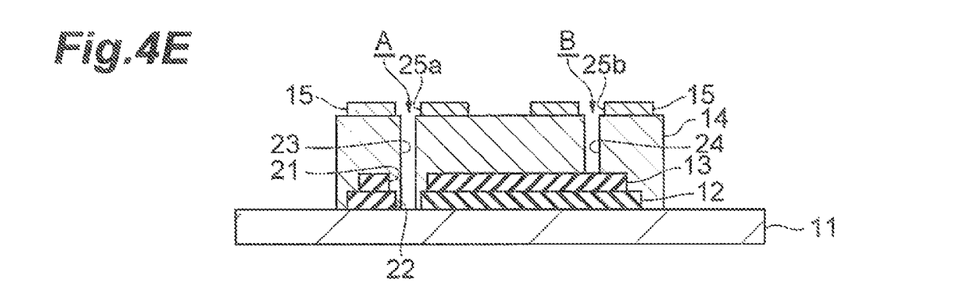

Next, as illustrated in FIG. 4E, the insulating layer 15 is formed. At the time, an opening 25a of the insulating layer 15 is provided right above the opening 23 of the protective layer 14, and an opening 25b of the insulating layer 15 is provided right above the opening 24 of the protective layer 14. By these processes of FIGS. 4D and 4E, a first through-hole A formed by the opening 23 and the opening 25a and a second through-hole B formed by the opening 24 and the opening 25b are formed. In the case of not providing the insulating layer 15, the first through-hole A is configured only by the opening 23 of the protective layer 14, and the second through-hole B is formed only by the opening 24 of the protective layer 14.

Figure 4F:
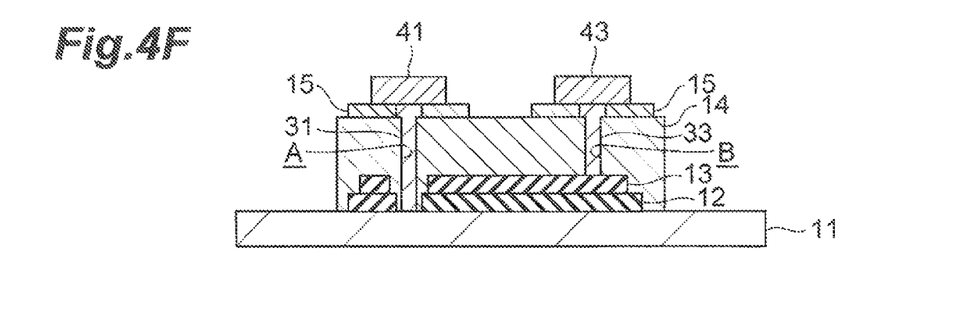

Then, seed deposition and plating are performed to form the first extraction electrode 31 provided in the first through-hole A and connected to the base electrode 11 and the first terminal electrode 41 provided on the first extraction electrode 31, and the second extraction electrode 33 provided in the second through-hole B and connected to the upper electrode layer 13 and the second terminal electrode 43 provided on the second extraction electrode 33 are formed (FIG. 4F).

In this way, according to the thin film capacitor 10 relating to the preset embodiment, since the Young's modulus of the protective layer 14 is equal to or lower than 2.0 GPa, deformation based on an electrostrictive effect of the dielectric layer 12 generated through the use of the capacitor can be absorbed by the protective layer 14, it becomes easy to maintain an electrical contact through the extraction electrodes 31 and 33 between the first terminal electrode 41 and the second terminal electrode 43 and base electrode 11 and the upper electrode layer 13, and thus the electrical contact of the base electrode 11 and the upper electrode layer 13 and the external circuit through the first terminal electrode 41 and the second terminal electrode 43 can be stably maintained. Also, since the Young's modulus of the protective layer 14 is equal to or higher than 0.1 GPa, the first terminal electrode 41 and the second terminal electrode 43 can be stably fixed onto the protective layer 14. Further, by providing the insulating layer 15 whose Young's modulus is equal to or higher than 3.0 GPa on a position to cover the protective layer 14 right under the first terminal electrode 41 and the second terminal electrode 43, the fixation of the first terminal electrode 41 and the second terminal electrode 43 to the protective layer 14 can be more stabilized.

Hereinafter, examples and comparative examples will be cited and the present invention will be more specifically described. However, the present invention is not limited to the following examples.

Figure 2:
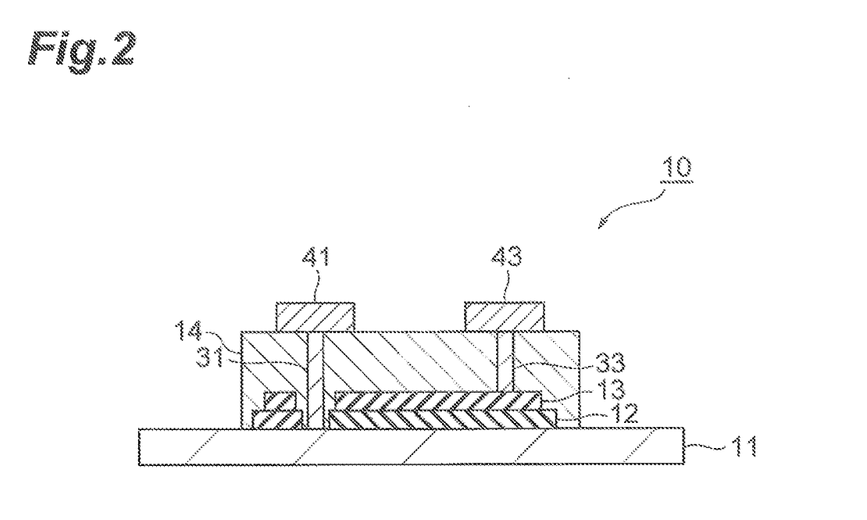
FIG. 2 is a schematic sectional view illustrating a structure of a thin film capacitor relating to another embodiment of the present invention.
Figure 3:
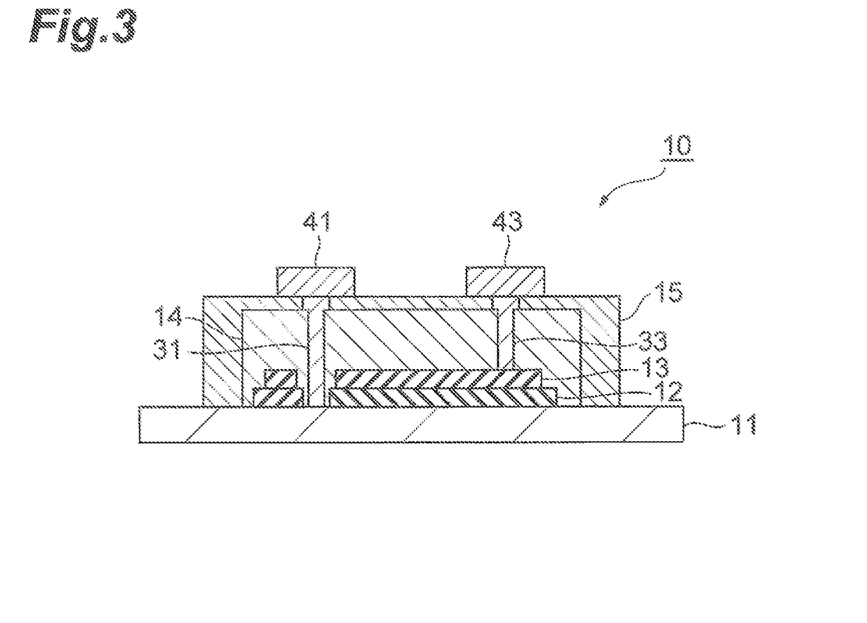
FIG. 3 is a schematic sectional view illustrating a structure of a thin film capacitor relating to a further embodiment of the present invention.

The thin film capacitors 10 having a sectional shape illustrated in one of FIG. 1 to FIG. 3 were manufactured and evaluated as examples 1-33 and comparative examples 1-3.

Examples 1-9

Ni foil with a thickness of 100 μm was prepared as the base electrode 11, and a BT layer as the dielectric layer 12 was formed on one surface thereof by the sputtering method such that a dielectric constant became 1000 and a film thickness became 900 nm. On the dielectric layer 12, a Ni layer as the upper electrode layer 13 (a lower layer, the side of the dielectric layer 12) was formed by the sputtering method, and a Cu layer as the upper electrode layer 13 (an upper layer) was formed on the Ni layer by the sputtering method. At the time, an area and a pattern shape of the upper electrode layer 13 and a thickness of the dielectric layer 12 were set such that capacitance became about 8000 pF (8 nF) (see FIG. 4A).

After the dielectric layer 12 and the upper electrode layer 13 were formed, heat treatment was executed. To the upper electrode layer 13 after the heat treatment, a resist layer having an opening corresponding to the opening 21 at a position to perform connection with the base electrode 11 was formed. A shape of the opening was turned to a square on a mask pattern, and a size was turned to 150 μm×150 μm on the mask pattern. Thereafter, the upper electrode layer 13 at the opening 21 was etched and removed by a ferric chloride solution. Thereafter, the resist layer was peeled off (see FIG. 4B).

To the dielectric layer 12 exposed at the position of the opening 21, a resist layer having an opening corresponding to the opening 22 was formed further. The shape of the opening was turned to a square on the mask pattern, and the size was turned to 100 μm×100 μm on the mask pattern. Thereafter, the dielectric layer 12 at the opening 22 was etched using a liquid mixture of hydrochloric acid and an ammonium fluoride solution. After the resist layer was peeled off thereafter, the heat treatment was executed (see FIG. 4C).

The protective layer 14 was formed using a photosensitive polyimide resin. For a material of the polyimide resin, a material for which (1) a normal polyimide monomer and (2) a polyimide monomer bonded with an alkyl group were mixed was used. Preliminary test pieces were prepared by changing a mixing ratio of these monomer (1) and monomer (2), and the Young's modulus were obtained. On the basis of a result of a preliminary test, formation was tried so that the Young's modulus of the protective layers 14 relating to the examples was obtained at three levels. The Young's modulus of the obtained protective layers 14 was obtained using a nanoindentation system (manufactured by Hysitron, Inc.). For measurement, a load-displacement curve was obtained 100 times per sample under a condition that the maximum load was 20 mN, the Young's modulus was calculated, and a mean value was obtained. Note that the maximum displacement amount was about ¼ or smaller from a surface to the film thickness of the protective layer 14, and influence of the base electrode 11 was not recognized. As a result of the measurement, it was confirmed that the Young's modulus of the protective layers 14 was at the three levels of 0.1 GPa, 1.0 GPa and 2.0 GPa. For the protective layers 14 having the Young's modulus at the three levels, the film thickness is turned to 3.0 μm, 5.0 μm, and 7.0 μm respectively, and the protective layers 14 at the total of nine levels were formed by the combinations. For the formed protective layers 14, the opening 23 of the protective layer was provided further inside the openings 21 and the 22, and the opening 24 of the protective layer was provided on a part without the opening 21 on the upper electrode layer 13 by photolithography. The shape of the opening 23 of the protective layer and the opening 24 of the protective layer was turned to a square on the mask pattern, and the size was turned to 50 μm×50 μm on the mask pattern (FIG. 4D)

The insulating layer 15 was formed using the photosensitive polyimide resin. The film thickness of the insulating layer 15 was turned to 2 μm. The mixing ratio of the monomers was changed by the same procedure as the case of the protective layer 14, and the insulating layer 15 whose Young's modulus was 3.0 GPa was obtained. By the photolithography, the opening 25a of the insulating layer was provided right above the opening 23 of the protective layer, and the opening 25b of the insulating layer was provided right above the opening 24 of the protective layer respectively, and the first through-hole A and the second through-hole B were attained. The shape of the opening 25a of the insulating layer and the opening 25b of the insulating layer was turned to a square on the mask pattern, and the size was turned to 75 μm×75 μm on the mask pattern. Also, a pattern was formed so that the insulating layer 15 remains only right below the first terminal electrode 41 and the second terminal electrode 43 described later and the periphery thereof (see FIG. 4E).

By the procedure above, the total of 270 pieces (30 pieces per level) of thin film capacitor elements for which the Young's modulus and the film thickness of the protective layer 14 were changed at nine levels (corresponding to the examples 1-9. See table 1 for the individual levels.) were obtained. To the thin film capacitor elements, by Cu seed deposition and Cu plating, the first extraction electrode 31 and the first terminal electrode 41, and the second extraction electrode 33 and the second terminal electrode 43 were formed. At the time, the first extraction electrode 31 was connected with the base electrode 11 through the first through-hole A, the first terminal electrode 41 was brought into contact with an upper end of the first extraction electrode 31, the second extraction electrode 33 was connected with the upper electrode layer 13 through the second through-hole B, and the second terminal electrode 43 was brought into contact with an upper end of the second extraction electrode 33. Further, the first terminal electrode 41 and the second terminal electrode 43 were manufactured in the shape to exist in an area narrower than the insulating layer 15 (see FIG. 4F).

The thin film capacitor element is diced into the shape of a width being 0.8 mm and a length being 1.6 mm by dicing, and 270 pieces of the thin film capacitors 10 were obtained. When the obtained thin film capacitors 10 were mounted on a printed wiring board for a substrate bending resistance test having a thickness of 0.8 mm, based on JIS C 60068-2-21: 2009, electrostatic capacities were measured under the condition of 1 Vrms, 1 kHz and a room temperature, and the mean value and standard deviation were calculated, the mean value became 8.05 nF, and the standard deviation became 0.2 nF. Also, when insulation resistance values were measured, they were within a range of 1.0 to $2.0 \times 10^{11} \Omega$.

Subsequently, a first substrate bending resistance test was conducted to the thin film capacitors 10. The printed wiring board mounted with the thin film capacitors 10 was bent to 4.0 mm at a pressurizing speed of 1.0 mm/s on the basis of JIS C 60068-2-21:2009, and was held for 20 seconds. Thereafter, after bending force was relaxed, the electrostatic capacities were measured under the condition of 1 Vrms, 1 kHz and the room temperature, the thin film capacitors 10 being equal to or below 1/1000 to the electrostatic capacity before the first substrate bending resistance test was executed were determined as NG, and the number of NG was counted and defined as an evaluation result.

Next, a moisture resistance operation test was conducted to the thin film capacitors 10. In the moisture resistance operation test, the thin film capacitors 10 mounted on the printed wiring board were put into a thermostatic bath adjusted to 60° C. and 90% RH, and an AC voltage of 4 Vrms and 1 kHz was applied for 1000 hours. For the thin film capacitors 10 after the lapse of 1000 hours, the electrostatic capacities and insulation resistance were measured again, the thin film capacitors 10 whose insulation resistance value was equal to or below 1/100 to the insulation resistance value before being put into the thermostatic bath were determined as NG, and the number of NG was counted and defined as the evaluation result.

Subsequently, a second substrate bending resistance test was conducted to the thin film capacitors 10 in the same condition as the first substrate bending resistance test. After the bending force was relaxed, the electrostatic capacities were measured under the condition of 1 Vrms, 1 kHz and the room temperature, the thin film capacitors 10 being equal to or below 1/1000 to the electrostatic capacity before the second substrate bending resistance test was executed were determined as NG, and the number of NG was counted and defined as the evaluation result.

Examples 10-12

Except for that fact that the insulating layer 15 covered the entire area of the protective layer 14 with the Young's modulus of the protective layer 14 being at the three levels of 0.1 GPa, 1.0 GPa and 2.0 GPa and the film thickness of the protective layer 14 being at one level of 5.0 μm, the thin film capacitors 10 were manufactured by the procedure similar to that of the examples 1-9, and the evaluations similar to that for the examples 1-9 were executed. When the electrostatic capacities of the obtained thin film capacitors 10 were measured and the mean value and the standard deviation were calculated, the mean value became 8.05 nF, and the standard deviation became 0.17 nF. Also, when the insulation resistance values were measured, they were within the range of 1.0 to $2.0 \times 10^{11} \Omega$.

Examples 13-18

Except for the fact that the Young's modulus of the insulating layer 15 was at the two levels of 1.0 GPa and 2.8 GPa with the Young's modulus of the protective layer 14 being at the three levels of 0.1 GPa, 1.0 GPa and 2.0 GPa and the film thickness of the protective layer 14 being at one level of 5.0 μm, the thin film capacitors 10 were manufactured by the procedure similar to that of the examples 1-9, and the evaluations similar to that for the examples 1-9 were executed. When the electrostatic capacities of the obtained thin film capacitors 10 were measured and the mean value and the standard deviation were calculated, the mean value became 8.05 nF, and the standard deviation became 0.18 nF. Also, when the insulation resistance values were measured, they were within the range of 1.0 to $2.0 \times 10^{11} \Omega$.

Examples 19-21

Except for the fact that the insulating layer 15 was not provided with the Young's modulus of the protective layer 14 being at the three levels of 0.1 GPa, 1.0 GPa and 2.0 GPa and the film thickness of the protective layer 14 being at one level of 5.0 μm, and the first terminal electrode 41 and the second terminal electrode 43 were provided on the protective layer 14, the thin film capacitors 10 were manufactured by the procedure similar to that of the examples 1-9, and the evaluations similar to that for the examples 1-9 were executed. When the electrostatic capacities of the obtained thin film capacitors 10 were measured and the mean value and the standard deviation were calculated, the mean value became 8.01 nF, and the standard deviation became 0.21 nF. Also, when the insulation resistance values were measured, they were within the range of 1.0 to $2.0 \times 10^{11} \Omega$.

Examples 22-24

Except for the fact that a Ni thin film having the thickness of 600 nm was formed on an alumina substrate having the thickness of 500 μm for the base electrode 11, the Young's modulus of the protective layer 14 was fixed at one level of 1.0 GPa, the film thickness of the protective layer 14 was fixed at one level of 5.0 μm, and the insulating layer 15 was only at right below the first terminal electrode 41 or the second terminal electrode 43 and the periphery thereof respectively with the Young's modulus being 3.0 GPa (example 22), the insulating layer 15 covered the entire area of the protective layer 14 with the Young's modulus being 3.0 GPa (example 23) or the insulating layer 15 was only at right below the first terminal electrode 41 or the second terminal electrode 43 and the periphery thereof with the Young's modulus being 2.8 GPa (example 24), the thin film capacitors 10 were manufactured by the procedure similar to that of the examples 1-9, and the evaluations similar to that for the examples 1-9 were executed except that a bending amount of the substrate bending resistance test was turned to 2.0 mm. When the electrostatic capacities of the obtained thin film capacitors 10 were measured and the mean value and the standard deviation were calculated, the mean value became 8.06 nF, and the standard deviation became 0.14 nF. Also, when the insulation resistance values were measured, they were within the range of 1.0 to $2.0 \times 10^{11} \Omega$.

Example 25

Except for the fact that the Ni thin film having the thickness of 600 nm was formed on the alumina substrate having the thickness of 500 μm for the base electrode 11, the Young's modulus of the protective layer 14 was fixed at one level of 1.0 GPa, the film thickness of the protective layer 14 was fixed at one level of 5.0 μm, the insulating layer 15 was not provided, and the first terminal electrode 41 and the second terminal electrode 43 were provided on the protective layer 14, the thin film capacitors 10 were manufactured by the procedure similar to that of the examples 1-9, and the evaluations similar to that for the examples 1-9 were executed except that the bending amount of the substrate bending resistance test was turned to 2.0 mm. When the electrostatic capacities of the obtained thin film capacitors 10 were measured and the mean value and the standard deviation were calculated, the mean value became 8.02 nF, and the standard deviation became 0.14 nF. Also, when the insulation resistance values were measured, they were within the range of 1.0 to $2.0 \times 10^{11} \Omega$.

Example 26-27

Except for the fact that the Young's modulus of the protective layer 14 was fixed at one level of 1.0 GPa, and the film thickness of the protective layer 14 was at the two levels of 2.5 μm (example 26) and 7.5 μm (example 27), the thin film capacitors 10 were manufactured by the procedure similar to that of the examples 1-9, and the evaluations similar to that for the examples 1-9 were executed. When the electrostatic capacities of the obtained thin film capacitors 10 were measured and the mean value and the standard deviation were calculated, the mean value became 8.04 nF, and the standard deviation became 0.23 nF. Also, when the insulation resistance values were measured, they were within the range of 1.0 to $2.0 \times 10^{11} \Omega$.

Examples 28-29

Except for the fact that the Young's modulus of the protective layer 14 was fixed at one level of 1.0 GPa, the film thickness of the protective layer 14 was at the two levels of 2.5 μm (example 28) and 7.5 μm (example 29), and the Young's modulus of the insulating layer 15 was fixed at one level of 2.8 GPa, the thin film capacitors 10 were manufactured by the procedure similar to that of the examples 1-9, and the evaluations similar to that for the examples 1-9 were executed. When the electrostatic capacities of the obtained thin film capacitors 10 were measured and the mean value and the standard deviation were calculated, the mean value became 8.04 nF, and the standard deviation became 0.22 nF. Also, when the insulation resistance values were measured, they were within the range of 1.0 to $2.0 \times 10^{11} \Omega$.

Examples 30-31

Except for the fact that the Young's modulus of the protective layer 14 was fixed at one level of 1.0 GPa, the film thickness of the protective layer 14 was at the two levels of 2.5 μm (example 30) and 7.5 μm (example 31), the insulating layer 15 was not provided, and the first terminal electrode 41 and the second terminal electrode 43 were provided on the protective layer 14, the thin film capacitors 10 were manufactured by the procedure similar to that of the examples 1-9, and the evaluations similar to that for the examples 1-9 were executed. When the electrostatic capacities of the obtained thin film capacitors 10 were measured and the mean value and the standard deviation were calculated, the mean value became 8.01 nF, and the standard deviation became 0.22 nF. Also, when the insulation resistance values were measured, they were within the range of 1.0 to $2.0 \times 10^{11} \Omega$.

Examples 32-33

Except for the fact that the Ni thin film having the thickness of 600 nm was formed on the alumina substrate having the thickness of 500 μm for the base electrode 11, the Young's modulus of the protective layer 14 was fixed at one level of 1.0 GPa, the film thickness of the protective layer 14 was at the two levels of 2.5 μm (example 32) and 7.5 μm (example 33), the insulating layer 15 was not provided, and the first terminal electrode 41 and the second terminal electrode 43 were provided on the protective layer 14, the thin film capacitors 10 were manufactured by the procedure similar to that of the examples 1-9, and the evaluations similar to that for the examples 1-9 were executed except that the bending amount of the substrate bending resistance test was turned to 2.0 mm. When the electrostatic capacities of the obtained thin film capacitors 10 were measured and the mean value and the standard deviation were calculated, the mean value became 7.99 nF, and the standard deviation became 0.21 nF. Also, when the insulation resistance values were measured, they were within the range of 1.0 to $2.0 \times 10^{11} \Omega$.

Comparative Examples 1-3

Except for that fact that the Young's modulus of the protective layer 14 was turned to 0.05 GPa (comparative example 1), 2.5 GPa (comparative example 2) and 3.0 GPa (comparative example 3), and the film thickness of the protective layer 14 was fixed at one level of 5.0 μm, the thin film capacitors 10 were manufactured by the procedure similar to that of the examples 1-9, and the evaluations similar to that for the examples 1-9 were executed. When the electrostatic capacities of the obtained thin film capacitors 10 were measured and the mean value and the standard deviation were calculated, the mean value became 8.00 nF, and the standard deviation became 0.15 nF. Also, when the insulation resistance values were measured, they were within the range of 1.0 to $2.0 \times 10^{11} \Omega$.

For the examples 1-33 and the comparative examples 1-3 above, results of a moisture resistance reliability test and the substrate bending resistance test conducted before and after that are indicated in Table 1 to Table 4.

TABLE 1

|  | Protective layer 14 Young's modulus [GPa] | Protective layer 14 film thickness [μm] | Insulating layer 15 presence/ absence | Installation area of insulating layer 15 | Insulating layer 15 Young's modulus [GPa] |
| --- | --- | --- | --- | --- | --- |
| Example 1 | 0.1 | 3.0 | Present | below terminal electrodes and its periphery | 3.0 |
| Example 2 | 1.0 | 3.0 | Present | below terminal electrodes and its periphery | 3.0 |
| Example 3 | 2.0 | 3.0 | Present | below terminal electrodes and its periphery | 3.0 |
| Example 4 | 0.1 | 5.0 | Present | below terminal electrodes and its periphery | 3.0 |
| Example 5 | 1.0 | 5.0 | Present | below terminal electrodes and its periphery | 3.0 |
| Example 6 | 2.0 | 5.0 | Present | below terminal electrodes and its periphery | 3.0 |
| Example 7 | 0.1 | 7.0 | Present | below terminal electrodes and its periphery | 3.0 |
| Example 8 | 1.0 | 7.0 | Present | below terminal electrodes and its periphery | 3.0 |
| Example 9 | 2.0 | 7.0 | Present | below terminal electrodes and its periphery | 3.0 |
| Example 10 | 0.1 | 5.0 | Present | Covering entire area of protective layer 14 | 3.0 |
| Example 11 | 1.0 | 5.0 | Present | Covering entire area of protective layer 14 | 3.0 |
| Example 12 | 2.0 | 5.0 | Present | Covering entire area of protective layer 14 | 3.0 |
| Example 13 | 0.1 | 5.0 | Present | below terminal electrodes and its periphery | 1.0 |
| Example 14 | 1.0 | 5.0 | Present | below terminal electrodes and its periphery | 1.0 |
| Example 15 | 2.0 | 5.0 | Present | below terminal electrodes and its periphery | 1.0 |
| Example 16 | 0.1 | 5.0 | Present | below terminal electrodes and its periphery | 2.8 |
| Example 17 | 1.0 | 5.0 | Present | below terminal electrodes and its periphery | 2.8 |
| Example 18 | 2.0 | 5.0 | Present | below terminal electrodes and its periphery | 2.8 |

TABLE 2

|  | Protective layer 14 Young's modulus [GPa] | Protective layer 14 film thickness [μm] | Insulating layer 15 presence/ absence | Installation area of insulating layer 15 | Insulating layer 15 Young's modulus [GPa] |
| --- | --- | --- | --- | --- | --- |
| Example 19 | 0.1 | 5.0 | Absent | — | — |
| Example 20 | 1.0 | 5.0 | Absent | — | — |
| Example 21 | 2.0 | 5.0 | Absent | — | — |
| Example 22 | 1.0 | 5.0 | Present | below terminal electrodes and its periphery | 3.0 |
| Example 23 | 1.0 | 5.0 | Present | Covering entire area of protective layer 14 | 3.0 |
| Example 24 | 1.0 | 5.0 | Present | below terminal electrodes and its periphery | 2.8 |
| Example 25 | 1.0 | 5.0 | Absent | — | — |
| Example 26 | 1.0 | 2.5 | Present | below terminal electrodes and its periphery | 3.0 |
| Example 27 | 1.0 | 7.5 | Present | below terminal electrodes and its periphery | 3.0 |
| Example 28 | 1.0 | 2.5 | Present | below terminal electrodes and its periphery | 2.8 |
| Example 29 | 1.0 | 7.5 | Present | below terminal electrodes and its periphery | 2.8 |
| Example 30 | 1.0 | 2.5 | Absent | — | — |
| Example 31 | 1.0 | 7.5 | Absent | — | — |
| Example 32 | 1.0 | 2.5 | Absent | — | — |
| Example 33 | 1.0 | 7.5 | Absent | — | — |

TABLE 2-continued

|  | Protective layer 14 Young's modulus [GPa] | Protective layer 14 film thickness [μm] | Insulating layer 15 presence/ absence | Installation area of insulating layer 15 | Insulating layer 15 Young's modulus [GPa] |
| --- | --- | --- | --- | --- | --- |
| Comparative example 1 | 0.05 | 5.0 | Present | below terminal electrodes and its periphery | 3.0 |
| Comparative example 2 | 2.5 | 5.0 | Present | below terminal electrodes and its periphery | 3.0 |
| Comparative example 3 | 3.0 | 5.0 | Present | below terminal electrodes and its periphery | 3.0 |

TABLE 3

|  | Base electrode material and structure | Substrate bending resistance test bending amount [mm] | NG rate after first substrate bending resistance test | NG rate after moisture resistance operation test | NG rate after second substrate bending resistance test |
| --- | --- | --- | --- | --- | --- |
| Example 1 | Ni foil (100 μm) | 4.0 | 0/30 | 0/30 | 0/30 |
| Example 2 | Ni foil (100 μm) | 4.0 | 0/30 | 0/30 | 0/30 |
| Example 3 | Ni foil (100 μm) | 4.0 | 0/30 | 0/30 | 0/30 |
| Example 4 | Ni foil (100 μm) | 4.0 | 0/30 | 0/30 | 0/30 |
| Example 5 | Ni foil (100 μm) | 4.0 | 0/30 | 0/30 | 0/30 |
| Example 6 | Ni foil (100 μm) | 4.0 | 0/30 | 0/30 | 0/30 |
| Example 7 | Ni foil (100 μm) | 4.0 | 0/30 | 0/30 | 0/30 |
| Example 8 | Ni foil (100 μm) | 4.0 | 0/30 | 0/30 | 0/30 |
| Example 9 | Ni foil (100 μm) | 4.0 | 0/30 | 0/30 | 0/30 |
| Example 10 | Ni foil (100 μm) | 4.0 | 0/30 | 0/30 | 0/30 |
| Example 11 | Ni foil (100 μm) | 4.0 | 0/30 | 0/30 | 0/30 |
| Example 12 | Ni foil (100 μm) | 4.0 | 0/30 | 0/30 | 0/30 |
| Example 13 | Ni foil (100 μm) | 4.0 | 0/30 | 0/30 | 2/30 |
| Example 14 | Ni foil (100 μm) | 4.0 | 0/30 | 0/30 | 3/30 |
| Example 15 | Ni foil (100 μm) | 4.0 | 0/30 | 0/30 | 3/30 |
| Example 16 | Ni foil (100 μm) | 4.0 | 0/30 | 0/30 | 1/30 |
| Example 17 | Ni foil (100 μm) | 4.0 | 0/30 | 0/30 | 2/30 |
| Example 18 | Ni foil (100 μm) | 4.0 | 0/30 | 0/30 | 2/30 |

TABLE 4

|  | Base electrode material and structure | Substrate bending resistance test bending amount [mm] | NG rate after first substrate bending resistance test | NG rate after moisture resistance operation test | NG rate after second substrate bending resistance test |
| --- | --- | --- | --- | --- | --- |
| Example 19 | Ni foil (100 μm) | 4.0 | 0/30 | 0/30 | 5/30 |
| Example 20 | Ni foil (100 μm) | 4.0 | 0/30 | 0/30 | 4/30 |
| Example 21 | Ni foil (100 μm) | 4.0 | 0/30 | 0/30 | 5/30 |
| Example 22 | Alumina substrate/ Ni layer (600 nm) | 2.0 | 0/30 | 0/30 | 5/30 |
| Example 23 | Alumina substrate/ Ni layer (600 nm) | 2.0 | 0/30 | 0/30 | 4/30 |
| Example 24 | Alumina substrate/ Ni layer (600 nm) | 2.0 | 0/30 | 0/30 | 6/30 |
| Example 25 | Alumina substrate/ Ni layer (600 nm) | 2.0 | 0/30 | 0/30 | 8/30 |
| Example 26 | Ni foil (100 μm) | 4.0 | 0/30 | 0/30 | 3/30 |
| Example 27 | Ni foil (100 μm) | 4.0 | 0/30 | 0/30 | 4/30 |
| Example 28 | Ni foil (100 μm) | 4.0 | 0/30 | 0/30 | 6/30 |
| Example 29 | Ni foil (100 μm) | 4.0 | 0/30 | 0/30 | 7/30 |
| Example 30 | Ni foil (100 μm) | 4.0 | 0/30 | 0/30 | 8/30 |
| Example 31 | Ni foil (100 μm) | 4.0 | 0/30 | 0/30 | 9/30 |
| Example 32 | Alumina substrate/ Ni layer (600 nm) | 2.0 | 0/30 | 0/30 | 8/30 |

TABLE 4-continued

|  | Base electrode material and structure | Substrate bending resistance test bending amount [mm] | NG rate after first substrate bending resistance test | NG rate after moisture resistance operation test | NG rate after second substrate bending resistance test |
|---|---|---|---|---|---|
| Example 33 | Alumina substrate/ Ni layer (600 nm) | 2.0 | 0/30 | 0/30 | 10/30 |
| Comparative example 1 | Ni foil (100 μm) | 4.0 | 0/30 | 2/30 | 28/28 |
| Comparative example 2 | Ni foil (100 μm) | 4.0 | 0/30 | 1/30 | 29/29 |
| Comparative example 3 | Ni foil (100 μm) | 4.0 | 0/30 | 3/30 | 27/27 |

As indicated in Table 1 and Table 2, for the thin film capacitor obtained by implementation of the present invention, it is confirmed that the electrical connection performance of the terminal electrode with the lower electrode and the upper electrode layer is maintained, and the electrical connection with the external circuit is more stabilized.

What is claimed is:

1. A thin film capacitor comprising:
   a laminated body that has a base electrode, a dielectric layer and an upper electrode layer in this order;
   a protective layer that covers at least a part of the base electrode, the dielectric layer and the upper electrode layer, and includes a first through-hole that reaches the base electrode, and a second through-hole that reaches the upper electrode layer;
   a first extraction electrode that is provided in the first through-hole and electrically connected with the base electrode;
   a second extraction electrode that is provided in the second through-hole and electrically connected with the upper electrode layer;
   a first terminal electrode that is arranged on the protective layer, and connected with the base electrode through the first extraction electrode;
   a second terminal electrode that is arranged on the protective layer, and connected with the upper electrode layer through the second extraction electrode; and
   an insulating layer including an opening respectively between the protective layer and the first terminal electrode, and between the protective layer and the second terminal electrode,
   wherein a modulus of longitudinal elasticity (Young's modulus) of the protective layer is equal to or higher than 0.1 GPa and equal to or lower than 2.0 GPa, and
   wherein the first extraction electrode is connected with the first terminal electrode through the opening of one of the insulating layers, and the second extraction electrode is connected with the second terminal electrode through the opening of the other insulating layer.

2. The thin film capacitor according to claim 1, wherein a thickness between an upper surface of the protective layer and an upper end of the upper electrode layer is equal to or thicker than 3.0 μm and is equal to or thinner than 7.0 μm.

3. The thin film capacitor according to claim 1, wherein one of the insulating layers covers a part under the first terminal electrode and the periphery thereof in the protective layer, and the other insulating layer covers a part under the second terminal electrode and the periphery thereof in the protective layer.

4. The thin film capacitor according to claim 1, wherein a modulus of longitudinal elasticity (Young's modulus) of the insulating layers is equal to or higher than 3.0 GPa.

5. The thin film capacitor according to claim 1, wherein the base electrode is Ni foil.

* * * * *